United States Patent Office 3,775,335
Patented Nov. 27, 1973

3,775,335
DIBASIC ACID ANHYDRIDES
Philip G. Irwin, Penn Hills Township, Allegheny County, Thomas J. McNaughtan, Brentwood, and Anargiros Pete Patellis, Rostraver Township, Westmoreland County, Pa., assignors to Hercules Incorporated, Wilmington, Del.
No Drawing. Filed July 21, 1971, Ser. No. 164,918
Int. Cl. C08f 45/72
U.S. Cl. 252—182                  4 Claims

ABSTRACT OF THE DISCLOSURE

A substantially solvent-free composition being liquid at ambient temperatures comprising: 3 methyl-Δ4-tetrahydrophthalic anhydride; 4-methyl - Δ4 - tetrahydrophthalic anhydride; and, optionally, polymeric anhydride. The composition is characterized by a low melting point, preferably in the range of —40 to 7° C., and is prepared by reacting equal molar amounts of (i) a mixture of diolefins consisting essentially of isoprene and piperylene present in a diene molar ratio ranging from 60:40 respectively to 5:95 respectively, said diene molar ratio being based on the diene content of said mixture; and (ii) maleic anhydride.

---

This invention relates to dibasic acid anhydrides; more particularly to a mixture of 3-methyl-Δ4-tetrahydrophthalic anhydride and 4-methyl-Δ4-tetrahydrophthalic anhydride (hereinafter referred to by the shorthand designation "3,4 - methyl - Δ4 - tetrahydrophthalic anhydride") which is liquid at room temperature. This invention also relates to 3,4-methyl-Δ4-tetrahydrophthalic anhydride containing polymeric anhydride which is liquid at room temperature.

Anhydrides of dibasic acids have been found to be useful in a variety of applications because of their high reactivity. For example, alkyd resins are synthesized by reacting a polyhydric alcohol, a polybasic acid (or anhydride), and fatty acid diglycerides. The main polybasic acid constituent of these resins has been phthalic anhydride. More recently, isophthalic acid, tetrahydrophthalic anhydride, hexahydrophthalic anhydride, and trimellitic anhydride have been used in the preparation of alkyd resins. A disadvantage of all of the aforementioned compounds in alkyd resin applications is that fact that they are solid materials and must be heated to render them molten for blending. And at the temperatures required for blending, sublimation losses occur.

Polybasic anhydrides are also widely used as hardening agents for epoxy resin systems. Anhydrides are excellent for this purpose, can be conveniently handled, and permit good heat control during production. An important property of any anhydride used in epoxy systems is low viscosity because of the requirement that the anhydride be blended with relatively viscous epoxy resins. The anhydride/epoxy mix must also exhibit low heat distortion during and after the curing cycle. The anhydrides which have found some application as hardeners for epoxy resins include methyl nadic anhydride (methylbicyclo[2.2.1] heptene-2, 3-dicarboxylic anhydride), dodecenyl-succinic anhydride, hexahydrophthalic anhydride, phthalic anhydride, maleic anhydride, succinic anhydride, and tetrahydrophthalic anhydride. These anhydrides, however, are either solids or highly viscous liquids at room temperature, thereby making them difficult to handle in epoxy systems.

We have discovered a dibasic acid anhydride which, surprisingly, is a liquid at room temperatures. The anhydride is 3,4-methyl-Δ4-tetra-hydrophthalic anhydride. The new anhydride is unexpectedly tri-functional, a property which makes it particularly advantageous for use in alkyd resins over those compounds used heretofore. It exhibits unusually low viscosity at room temperature, thus making it more useful as a hardening agent for epoxy resins compared with the prior art hardening agents recited above. Epoxy mixes containing the anhydride exhibit higher flexural strength, a lower modulus of elasticity and less heat distortion than heretofore experienced with other hardeners.

The composition of the present invention is a substantially solvent-free, liquid mixture of 3-methyl-Δ4-tetrahydrophthalic anhydride and 4 - methyl - Δ4 - tetrahydrophthalic anhydride of the formulae, respectively:

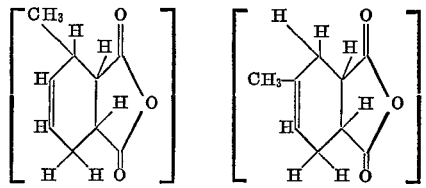

where preferably the 3-methyl- is present in the range of 50 to 83 percent by weight with the remainder being 4-methyl-. The liquid composition is characterized by a melting point in the range of 0 to minus 15° C.

The mixture of 3-methyl- and 4-methyl- may optionally contain polymeric anhydride in the range of 2 to 12 percent by weight. When present, the polymeric anhydride consists essentially of a piperylene-maleic anhydride-cyclopentene copolymer of the general formula:

$$(C_9H_{10}O_3)_x$$

wherein the value of X ranges between 2 to 4 inclusive.

The two monomeric anhydrides, 3-methyl- and 4-methyl-, are solid materials in pure form with melting points of 61–63° C. and 63–64° C., respectively, but when the mixture of the two is produced according to the process described hereinafter, the product is surprisingly a liquid at room temperature, with melting points well below 0° C. In addition, 3,4-methyl-Δ4-tetrahydrophthalic anhydride is reactive through the unsaturated Δ4 ethylenic linkage; this is in contrast to tetrahydrophthalic anhydride which is bi-functional. In the present invention, the unsaturated Δ4 ethylenic linkage is activated by the adjoining methyl group and this makes the anhydride unexpectedly tri-functional.

The presence of relatively small amounts of polymeric anhydride in the 3,4-methyl-Δ4-tetrahydrophthalic anhydride mixture produces an even lower melting point composition than the pure mixture. It is also conducive to greater reactivity in alkyd resins and this makes the 3,4-methyl-Δ-tetrahydrophthalic anhydride superior to other dibasic anhydrides as a constituent in resinous systems.

In addition to the composition just described, we provide a process for making 3-methyl-Δ4-tetrahydrophthalic anhydride a liquid at ambient temperatures comprising the step of admixing sufficient 4-methyl-Δ4-tetrahydrophthalic anhydride with said 3-methyl-Δ4-tetrahydrophthalic anhydride is present in the range of 50 to 83 percent by weight. We further provide that such process may include the additional step of admixing sufficient polymeric anhydride to said mixture of 3-methyl-Δ4-tetrahydrophthalic anhydride and 4-methyl-Δ4-tetrahydrophthalic anhydride to produce a resultant mixture consisting essentially of 3-methyl-Δ4-tetrahydrophthalic anhydride in the range of 40 to 95 percent by weight, polymeric anhydride in the range of 2 to 12 percent by weight and the remainder 4-methyl-Δ4-tetrahydrophthalic anhydride.

We further provide a process for preparing a mixture of anhydrides having a melting point in the range of —40 to 7° C. comprising the steps of reacting equal molar amounts of (i) a mixture of diolefins consisting essentially of isoprene (2-methyl-butadiene-1,3) and piperylene (pentadiene-1,3) present in a diene molar ratio ranging from 60:40 respectively to 5:95 respectively, said diene molar ratio being based on the diene content of said mixture and (ii) maleic anhydride; and recovering the product of said reaction. We preferably carry out the reaction at a temperature in the range of 62 to 63° C.

The composition of the present invention is preferably prepared by a process comprising the steps of reacting a mixture of diolefins with maleic anhydride in a solution of benzene and separating said anhydride from the reaction mixture. Preferably, the diolefin mixture consists essentially of isoprene in the range of 5 to 60% by weight with the balance piperylene. More particularly, the process steps comprise (i) heating a solution of maleic anhydride in benzene, preferably to a temperature of about 60° C.; (ii) adding a mixture of piperylene and isoprene to said solution over a period of 1.0 to 1.5 hours to form a reaction mixture while allowing the temperature of said mixture to exotherm to approximately 76° C. and to subsequently decrease to approximately 62–63° C.; (iii) maintaining said reaction mixture at 62–63° C. for about five hours; (iv) removing unreacted piperylene and isoprene and the solvent (benzene) by distillation; and (v) recovering the product, 3,4-methyl-$\Delta$4-tetrahydrophthalic anhydride from the reaction kettle.

The process just outlined involves the condensation reaction of a mixture of diolefins with maleic anhydride. According to the process, a slightly less than stoichiometric amount of maleic anhydride is dissolved in a low boiling aromatic solvent, preferably benzene. Maleic anhydride has good solubility in benzene as compared with its solubility in the low boiling paraffins or cyclic saturated solvents. A low boiling point solvent is used in the process to prevent crystallization of the product during the distillation step which follows. We have found that a portion of the product consisting of 4-methyl-$\Delta$4-tetrahydrophthalic anhydride sublimes more readily than the portion consisting of 3-methyl-4$\Delta$-tetrahydrophthalic anhydride and that a loss of 4-methyl isomer causes crystallization of the final product. The maleic anhydride should be free from maleic acid, the presence of which is indicated by incomplete benzene solubility.

The maleic anhydride solution is then reacted with a mixture of diolefins. The diolefin content may range from 5 to 60% isoprene with the remainder being piperylene together with residual impurities. It is preferable that the diolefin content be 60% piperylene and 40% isoprene so as to assure a liquid product whose melting point is well below room temperature. This composition corresponds to the lowest freezing (melting) mixture, commonly referred to as the eutectic mixture, which is obtained from freezing point diagrams using the pure diolefins separately and then by using mixtures of the diolefins and determining the freezing points of these mixtures relative to the product composition. By using 5 to 60% isoprene with the remainder being piperylene, a product melting below +20° C. is obtained, while using 7–54% isoprene with the remainder being piperylene, a product melting below 0° C. is obtained.

One of the advantages of the invention is that the source of diolefins for the process may be a crude mixed diolefin stream (hereafter called a $C_5$ stream) which is a by-product obtained from the cracking of naphtha. The $C_5$ stream may contain, in addition to diolefins, paraffins, olefins, cyclic olefins, and cyclic diolefins. Detailed analyses of a number of $C_5$ streams appear in the examples hereinbelow.

When benzene is used as the solvent for maleic anhydride, the condensation reaction is preferably carried out initially at about 60° C. to prevent crystallization of maleic anhydride. The condensation reaction is allowed to exotherm to about 76° C. For other solvents, the temperature of reaction must be above that temperature at which maleic anhydride crystallizes. The reaction mass is then refluxed above the boiling point of the residuals in the $C_5$ stream, that is, at the boiling point of the reaction mixture. The period of refluxing may vary from one to five hours to insure the absence of free maleic anhydride in the final product.

After refluxing, the product is separated from the reaction mass by distillation. A vapor temperature of 70° C. is sufficient to strip most of the $C_5$ stream residuals and benzene from the reaction mass. The product temperature is then maintained at about 90° C. and the pressure is gradually reduced to remove all of the benzene. We prefer to discharge a slow nitrogen stream over the surface of the reaction mass during distillation to insure a benzene-free product. The nitrogen purge is continued until benzene ceases to be distilled over.

The benzene distillate obtained during the distillation step of the process is retained for use in the next reaction. We have found that the anhydride product will sublime readily during distillation, causing slightly lower yields on the first cycle of the process. Recycle of the benzene, which contains the anhydride product, will increase the yield to nearly 100% in terms of the available diolefins and maleic anhydride charged.

Accurate charging procedures will produce a 3,4-methyl-$\Delta$4-tetrahydrophthalic anhydride which is free from crystallinity and substantially free of maleic anhydride and solvent. By the terms "substantially solvent-free," we mean containing less than 5 percent by weight solvent.

The following examples illustrate the practice of the invention. Unless otherwise stated, all percentages and parts are by weight.

EXAMPLE 1

91.5 lbs. of benzene was charged to a kettle together with 61.0 lbs. of maleic anhydride. The mixture was heated with agitation using a reflux condenser to a temperature of 60° C. Heating was discontinued and a mixture containing 17.0 lbs. of isoprene and 65.1 lbs. of a crude diolefin-bearing stream (containing about 43% piperylene and 1.2% isoprene) was added to the solution over a period of 1.5 hours. The analysis of the crude stream (designated stream A herein and supplied by the Monsanto Company) was as follows:

STREAM A

| Component: | Percent |
|---|---|
| Isoprene | 1.2 |
| 2-methyl 2-butene | 11.9 |
| Trans piperylene | 28.7 |
| Cis piperylene | 14.3 |
| Cyclopentene | 10.9 |
| Cyclopentadiene and/or cis 4-methyl 2-pentene | 4.3 |
| Trans 4-methyl 2-pentene | 1.1 |
| 2-methyl 1-pentene | 3.7 |
| 1-hexene | 0.8 |
| Dicyclopentadiene | 1.0 |
| Unknowns (16 components) | 20.7 |

The temperature rose to 76° C. due to the strong exotherm and gradually dropped to 62–63° C. Heating was resumed toward the end of the addition period to maintain the reaction temperature of 62–63° C.

The reaction mixture was refluxed for five hours while maintaining the temperature at 62–63° C. At the end of this period, distillation was begun, using the same slow nitrogen purge as was used during the entire reaction. The bulk of the $C_5$ overhead-benzene was distilled until the head temperature reached 79° C., then the pressure was slowly reduced until no more benzene distilled and the pot temperature reached 90° C. The liquid reaction mass was purged with a nitrogen stream until benzene ceased to distill over. The benzene distillate was retained for subsequent reactions. Finally, the product, 3,4-methyl-$\Delta$4-tetrahydrophthalic anhydride, was removed and filtered through a filter aid to remove the slight cloud in the crude product.

The liquid product had a freezing point of −14 to −35° C., an A-1 G–H Viscosity, and a G–1 color. Gas chromatographic analysis indicated no benzene or free maleic anhydride in the product. Polymer (consisting essentially of copolymers of piperylene, cyclopentene and maleic anhydride together with traces of cis-pentene-2, 2-methyl butene-2, 2-methyl pentene-1, and 4-methyl pentene-1) content was 4%. Conversion to product (polymer included) was 92 lbs.

EXAMPLE 2

Pure isoprene was reacted with maleic anhydride in benzene in the same manner as described in Example 1. Pure piperylene was likewise reacted with maleic anhydride. Then various mixtures of isoprene and piperylene were reacted with maleic anhydride in the same fashion. The results of those reactions are tabulated in Table I; they show that the mixture containing 60 mole percent piperylene and 40 mole percent isoprene is the lower freezing mixture, i.e. the eutectic mixture. It can also be observed from Table I that other mixtures of piperylene and isoprene also produce products which are liquid materials.

EXAMPLE 3

In this example, the nature of the polymer formed in the condensation of the dienes with maleic anhydride is illustrated. It will be recalled that the crude diolefin-bearing stream of Example 1 contained about 11% cyclopentene. Accordingly, a run was made using the general procedures of Example 1 except that the diolefin stream contained 92 percent by weight of isoprene and 8 percent by weight cyclopentene. The source of the isoprene (99% purity) was Enjay Chemical and was 99% pure. The results of the run are shown in Table II below as Run No. 1.

The 8% level of cyclopentene was chosen also for comparison with another crude diolefin-bearing stream (designated stream B herein and supplied by the Phillips Petroleum Company) which analyzed as follows:

STREAM B

| Component: | Percent |
|---|---|
| Cis-pentene-2 | 0.1 |
| 2-methyl butene-2 | 0.7 |
| Cyclopentane | 0.1 |
| Cyclopentene | 8.2 |
| Trans-pentadiene-1,3 | 83.0 |
| Cis-pentadiene-1,3 | 7.9 |

Runs carried out according to the procedures of Example 1 using stream B are reported as Run Nos. 2 and 3 in Table II below. Run 4 of Table II was made using similar procedures except that a small amount of free radical initiator in the form of t-butyl peroxide was deliberately added.

TABLE I

| Run No. | Diene/mole percent | Melting point, ° C. Crude product | Melting point, ° C. Polymer removed | Polymer content (weight percent) |
|---|---|---|---|---|
| 1 | Isoprene (99%) purity | 62–64 | 62–64 | 0 |
| 2 | Piperylene (91%) purity plus 8% cyclopentene | 46–50 | 54 | 32.1 |
| 3 | Piperylene (43%) purity | 25–33 | 36 | 6.95 |
| 4 | Piperylene (95%) plus Isoprene (5%) | 7 | 17 | 12.4 |
| 5 | Piperylene (80%) plus isoprene (20%) | −25.5 | −2 | 7.0 |
| 6 | Piperylene (60%) plus isoprene (40%) | −40 | −15 | 4.1 |
| 7 | Piperylene (50%) plus isoprene (50%) | −12 | 1 | 3.8 |
| 8 | Piperylene (40%) plus isoprene (60%) | 7 | 25 | 1.2 |

Note.—In Runs 3–8, the source of piperylene was the crude diolefin-bearing stream described in Example 1 (stream A). The piperylene and isoprene contents set forth in parentheses refer to mole percent of each diene in the stream.

Inspection of the runs shown in Table I show that the eutectic mixture had a composition of 60 mole percent piperylene and 40 mole percent isoprene, a polymer content of 4.1%, and a freezing point of −40° C. This latter freezing point represents a depression of the freezing point of approximately 100 degrees from the melting points of the adducts prepared from the pure dienes. Removal of the polymeric anhydride by precipitation with ether and subsequent evaporation of the ether resulted in an elevation of the freezing point, but the overall results indicated that the 60/40 mole ratio of piperylene/isoprene represented the composition of the eutectic.

TABLE II

| Run No. | Diene | Source | Melting point, ° C. Crude product | Melting point, ° C. Polymer removed | Polymer content (weight percent) |
|---|---|---|---|---|---|
| 1 | Isoprene plus 8% cyclopentene | Enjay | 62–65 | 62–64 | 7.0 |
| 2 | Piperylene | Stream B | 46–50 | 54 | 32.1 |
| 3 | Piperylene (60%) plus isoprene (40%) | Stream B, Enjay | 2 | 17 | 16.6 |
| 4 | Isoprene plus 0.25% t-butyl peroxide | Enjay | 57.5–62.5 | | 1.5 |

The results shown in Table II indicate that the polymeric anhydride forms by copolymerization of maleic anhydride with cyclopentene, cis-piperylene and trans-piperylene. It is likely that isoprene also reacts to some extent but its contribution to the copolymer is believed to be small in the absence of free radical initiator (see Run No. 4). Infrared analysis and cryoscopic determination of molecular weight further confirmed the fact that the polymers were polymeric anhydrides. Molecular weights of these polymers varied from 261 to 550.

EXAMPLE 4

In this example a crude diolefin bearing stream (designated C herein and supplied by Dow Chemical Company) containing approximately a 53:47 molar ratio of piperylene: isoprene and containing cyclopentene, 1-pentene and various light ends, notably butadiene, as the other major components was used. The analysis of stream C was as follows:

STREAM C

| Component: | Percent |
|---|---|
| 1-pentene | 12.8 |
| 2-methyl 1-butene | 1.1 |
| Cis 2-pentene | 1.8 |
| 2-methyl 2-butene | 1.3 |
| Cyclopentene | 10.4 |
| Trans 4-methyl 1-pentene | 0.8 |
| Cis-4-methyl 1-pentene and/or cyclopentadiene | 1.3 |
| Isoprene | 17.4 |
| Trans-piperylene | 11.7 |
| Cis-piperylene | 8.6 |
| Unknown | 5.8 |
| Light ends | 14.0 |
| Heavy ends | 12.5 |

Maleic anhydride was dissolved in benzene at a pot temperature of 60° C. with stirring and under a nitrogen atmosphere. Heating was discontinued and an equimolar amount of dienes carried in stream C was added to the solution over a period of 1.25 hours. The temperature rose to 63° C. due to the mild exotherm and gradually decreased to 51° C. Heating is resumed toward the end of the addition period to maintain the temperature at 52–53° C.

The reaction mixture was refluxed for five hours while maintaining the temperature at 52–53° C. At the end of this period, distillation was begun, using a slow nitrogen purge. The bulk of the $C_5$ overhead-benzene distillate was collected until the pot temperature reached 107° C., then the temperature was reduced to 95° C. and reduced pressure maintained for 1 hour to insure removal of benzene and any unreacted maleic anhydride. Heat and reduced pressure were discontinued and the liquid product was discharged.

The liquid product has a freezing point of −40 to −35° C., an A–1–G–H viscosity, and a G1/2–1 color. Yield of the liquid anhydride was 98.2%. The polymer content was 0%.

EXAMPLE 5

In this example a crude diolefin-bearing (designated stream "D" herein and supplied by Ameripol Inc., now Good-Rite Chemical Co.) containing approximately a 70:30 molar ratio of piperylene: isoprene and 2-methylbutene-2 as the major components was used. The analysis of stream D was as follows:

STREAM D

| Component | Percent |
|---|---|
| Isoprene | 9.0 |
| Cis-pentene-2 | 0.5 |
| 2-methyl butene-2 | 69.6 |
| Trans-piperylene | 11.5 |
| Cis-piperylene+cyclopentadiene | 6.9 |
| Cyclopentene | 1.6 |
| Cyclopentane | 0.5 |
| Unknowns (1 component) | 0.4 |

Maleic anhydride was dissolved in benzene at a pot temperature of 60° C. with stirring and under a nitrogen atmosphere. Heating was discontinued and an equimolar amount of dienes carried in stream D were added to the solution over a period of 1.0 hour. No exotherm was observed and the temperature decreased to 45° C. The reaction mixture was maintained overnight at room temperature under a nitrogen atmosphere. The reaction mixture was distilled at atmospheric pressure to remove the unreacted components and benzene until the pot temperature reached 125° C. No more distillate condensed at this temperature. Heating was discontinued and the product was cooled and discharged.

The liquid product had a freezing point of −14° C., an A G–H viscosity, and a G–4 color. Yield of the liquid anhydride was 90.6%. Polymer content was 13.6%. After standing for approximately one week, it was observed that some of the product had precipitated.

EXAMPLE 6

Mixtures in various proportions of individually synthesized 3-methyl-Δ4-tetrahydrophthalic anhydride and 4-methyl-Δ4-tetrahydrophthalic anhydride (both of 99+% purity) were prepared. Each mixture was melted in a breaker by heating the mixture gently on a hotplate and then allowed to cool to room temperature. The melting points of the liquid mixtures were determined to be as follows:

| Mixture components and proportions | | |
|---|---|---|
| 3-methyl Δ4-tetrahydrophthalic anhydride | 4-methyl-Δ4-tetrahydrophthalic anhydride | Melting |
| 100 | 0 | +61 |
| 80 | 20 | +5 |
| 60 | 40 | −23 |
| 40 | 60 | −4 |
| 20 | 80 | +25 |
| 0 | 100 | +63 |

The 3,4-methyl-Δ4-tetrahydrophthalic anhydride of the present invention may be advantageously used as the polybasic acid constituent of alkyd resins to form adducts with linseed and other unsaturated fatty oils. A distinct advantage of the liquid product is that it may be accurately measured for addition to the alcoholysis mixture. When combined with mono- and diglycerides, the 3,4-methyl-Δ4-tetrahydrophthalic anhydride yields alkyd resins which are readily compatible with drying oils to give excellent varnishes and vehicles for enamels. The following examples are illustrative:

EXAMPLE 7

700 parts of alkali-refined soya oil, 150 parts of 26 linseed oil, 80 parts of glycerine and 0.2 part of lithium napthenate are heated at a temperature in the range of 240–245° C. for 2 hours. 355 parts of liquid 3,4-methyl-Δ4-tetrahydrophthalic anhydride are added thereto over a period of 30 minutes. The resultant mixture is refluxed using a Dean-Stark trap at a temperature in the range of 235–245° C. for 3 hours. An adjustment is made with xylene to produce 60% solids. 0.6% lead and 0.06 cobalt are added as dryers. The product exhibited the following properties:

| | |
|---|---|
| Color | G–12 |
| Viscosity | U |
| Dry time (set), minutes | 30 |
| Dry time (hard), hours | 2 |

EXAMPLE 8

109.6 parts of alkali-refined soya oil, 24.0 parts of dehydrated castor oil, 80.0 parts of glycerine, and 0.02 part of lithium ricinoleate are heated to and held at a temperature in the range of 240–245° C. for 2 hours. 100 parts of 3,4-methyl-Δ4-tetrahydrophthalic anhydride are added and the resultant mixture is held at a temperature in the range of 240–245° C. for one hour using Dean-Stark tube. 11.0 rods of water are collected. 85.0 parts of tall oil are added to the mixture and the resultant mixture is held at a temperature in the range of 240 to 245° C. for 3 hours. 3.0 ml. of water are collected. The mixture is held at 240 to 245° C. for 2 more hours. An adjustment is made with xylene to produce 60% solids. 0.6% lead and 0.06% cobalt are added as dryers. The product exhibited the following properties:

| | |
|---|---|
| Viscosity | H |
| Color | G–11 |
| Dry time (set), hours | 15 |
| Dry time (hard), hours | 18 |

The 3,4-methyl-Δ4-tetrahydrophthalic anhydride also has application in epoxy casting systems. The solvency and compatability of this anhydride for solid and liquid epoxy resins makes possible low viscosity solutions with long pot life. The following examples are illustrative:

EXAMPLE 9

An epoxy blend of 3,4-methyl-Δ4-tetrahydrophthalic anhydride and shell Epon 828 (a trademark of Shell Chemical Company) epoxy resin present in a 90/100 weight ratio, together with 1% N,N-dimethylbenzylamine (based on total) was cured for 3 hours at 90° C. and for 4 hours at 120° C. The resin exhibited the following properties:

Heat deflection temperature—120° C. (264 p.s.i.)
Flexural strength—16,000 p.s.i.

EXAMPLE 10

An epoxy blend prepared with the same materials as in Example 9 except that the anhydride/epoxy weight ratio was 80/100 and cured in the same manner exhibited the following properties:

Heat deflection temperature—118° (264 p.s.i.)
Flexural strength—16,000 p.s.i.

We claim:
1. A substantially solvent-free composition having from 0% to 5% by weight of solvent and being liquid at ambient temperatures consisting essentially of:
   (A) 3-methyl-$\Delta$4-tetrahydrophthalic anhydride; and
   (B) 4-methyl-$\Delta$4-tetrahydrophthalic anhydride said 3-methyl - $\Delta$4 - tetrahydrophthalic anhydride being present in the range of 40 to 95 percent by weight.
2. A composition as recited in claim 1 which also includes a polymeric anhydide which consists essentially of copolymers of piperylene, maleic anhydride and cyclopentene, said polymeric anhydride being present in the angle of 2 to 12 percent by weight.
3. The composition of claim 2 which is characterized by a melting point in the range of —40 to 7° C.
4. A process for preparing a mixture of anhydrides having a melting point in the range of —40 to 7° C. comprising the steps of
   (A) reacting equal molar amounts of
      (i) a mixture of diolefins consisting essentially of isoprene and piperylene present in a diene molar ratio ranging from 60:40 respectively to 5:95 respectively, said diene molar ratio being based on the diene content of said mixture; and
      (ii) maleic anhydride
   and
   (B) recovering the product of said reaction.

References Cited

UNITED STATES PATENTS

| | | | |
|---|---|---|---|
| 3,470,214 | 9/1969 | Young | 260—346.3 |
| 3,647,701 | 3/1972 | Robinson et al. | 252—182 |
| 2,275,385 | 3/1942 | Soday | 260—346.6 |
| 3,245,916 | 4/1966 | Woskow | 252—182 |
| 3,247,125 | 4/1966 | Woskow | 252—182 |

LEON D. ROSDOL, Primary Examiner

I. GLUCK, Assistant Examiner

U.S. Cl. X.R.

252—407; 260—2 EA, 18 EP, 47 EA, 346.3

UNITED STATES PATENT OFFICE
CERTIFICATE OF CORRECTION

Patent No. 3,775,335                     Dated November 27, 1973

Inventor(s) Philip G. Irwin et al.

It is certified that error appears in the above-identified patent and that said Letters Patent are hereby corrected as shown below:

Column 2, line 57, after "anhydride" insert the following:

--to produce a mixture wherein said 3-methyl-
$\Delta$ 4-tetrahydrophthalic anhydride--.

Column 7, line 21, "has" should be --had--.

Column 7, line 74, "breaker" should be --beaker--.

Column 9, Claim 2, line 23, "anhydide" should be --anhydride--.

Column 9, Claim 2, line 26, "angle" should be --range--.

Signed and sealed this 9th day of April 1974.

(SEAL)
Attest:

EDWARD M. FLETCHER, JR.
Attesting Officer

C. MARSHALL DANN
Commissioner of Patents